Figure 1:
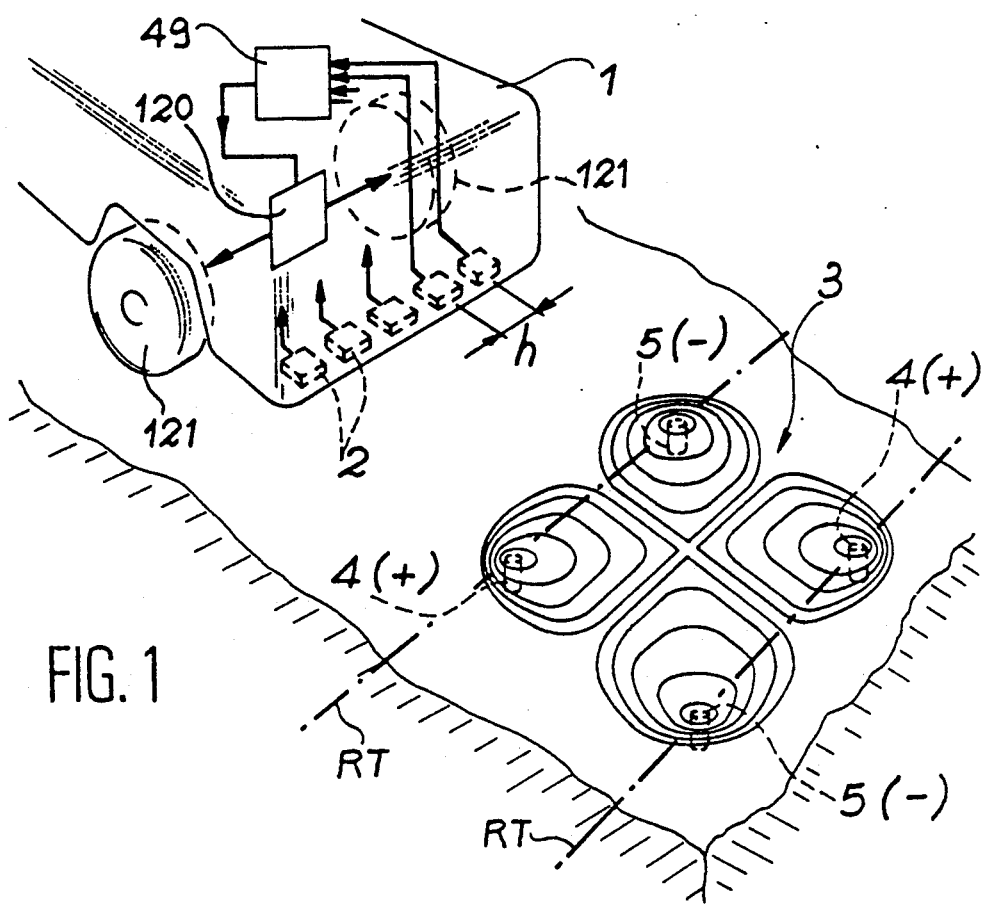

United States Patent [19]

Lemercier et al.

[11] Patent Number: 5,189,612
[45] Date of Patent: Feb. 23, 1993

[54] SYSTEM AND METHOD OF NAVIGATING THE TRAVEL OF AN AUTONOMOUS VEHICLE

[75] Inventors: Pierre Lemercier, Saint Martin le Vinoux; Philippe Trystram, Saint Egreve, both of France

[73] Assignee: Protee Groupement D'Interet Economique, Paris, France

[21] Appl. No.: 759,753

[22] Filed: Sep. 12, 1991
(Under 37 CFR 1.47)

Related U.S. Application Data

[63] Continuation of Ser. No. 506,552, Apr. 5, 1990, abandoned, which is a continuation of Ser. No. 149,388, Jan. 28, 1988, abandoned.

[30] Foreign Application Priority Data

Feb. 4, 1987 [FR] France .................. 87 01343

[51] Int. Cl.$^5$ .................................. G06F 15/50
[52] U.S. Cl. .................. 364/424.02; 364/449; 180/168; 180/169
[58] Field of Search ............ 364/424.01, 424.02, 364/449; 180/167, 168, 169

[56] References Cited

U.S. PATENT DOCUMENTS

| | | | |
|---|---|---|---|
| 4,424,875 | 1/1984 | Yoshida | 364/424.02 |
| 4,437,533 | 3/1984 | Bierkarre et al. | 180/168 |
| 4,472,716 | 9/1984 | Hansen | 340/905 |
| 4,530,056 | 7/1985 | MacKinnon et al. | 364/424.02 |
| 4,593,239 | 6/1986 | Yamamoto | 180/167 |
| 4,613,804 | 9/1986 | Swenson | 180/168 |
| 4,714,124 | 12/1987 | Laib | 180/168 |
| 4,716,530 | 12/1987 | Ogawa et al. | 364/424.02 |
| 4,742,283 | 5/1988 | Bolger et al. | 180/167 |
| 4,775,023 | 10/1988 | Shimada et al. | 180/168 |
| 4,777,601 | 10/1988 | Boegli | 364/424.02 |
| 4,790,402 | 12/1988 | Field et al. | 180/169 |
| 4,821,192 | 4/1989 | Taivalkoski et al. | 364/424.02 |
| 4,847,774 | 7/1989 | Tomikawa et al. | 364/424.02 |
| 4,855,915 | 8/1989 | Dallaire | 364/424.02 |

FOREIGN PATENT DOCUMENTS

| | | |
|---|---|---|
| 208384 | 1/1987 | European Pat. Off. |
| 2120270 | 8/1972 | France |
| 2239375 | 2/1975 | France |
| 60-20982 | 1/1985 | Japan |
| 2074760 | 11/1981 | United Kingdom |

OTHER PUBLICATIONS

Pat. Abstracts of Japan vol. 1. 10. No. 72 P-438.

*Primary Examiner*—Thomas G. Black
*Assistant Examiner*—Collin W. Park
*Attorney, Agent, or Firm*—Ladas & Parry

[57] ABSTRACT

A navigation system for an autonomous vehicle (1). It has a lateral row of detectors (2). The ground has discontinuous buried magnetic markers (3) setting up a localized field which in turn produces an induced current which varies in the detectors (2) in dependence on their position. The markers, formed by magnets (151-155) of selected polarity and number, form magnetic signatures which contain items of information for the vehicle. The on-board vehicle computer (1) can deduce its lateral position and the controls to be carried out to accomplish its mission.

20 Claims, 6 Drawing Sheets

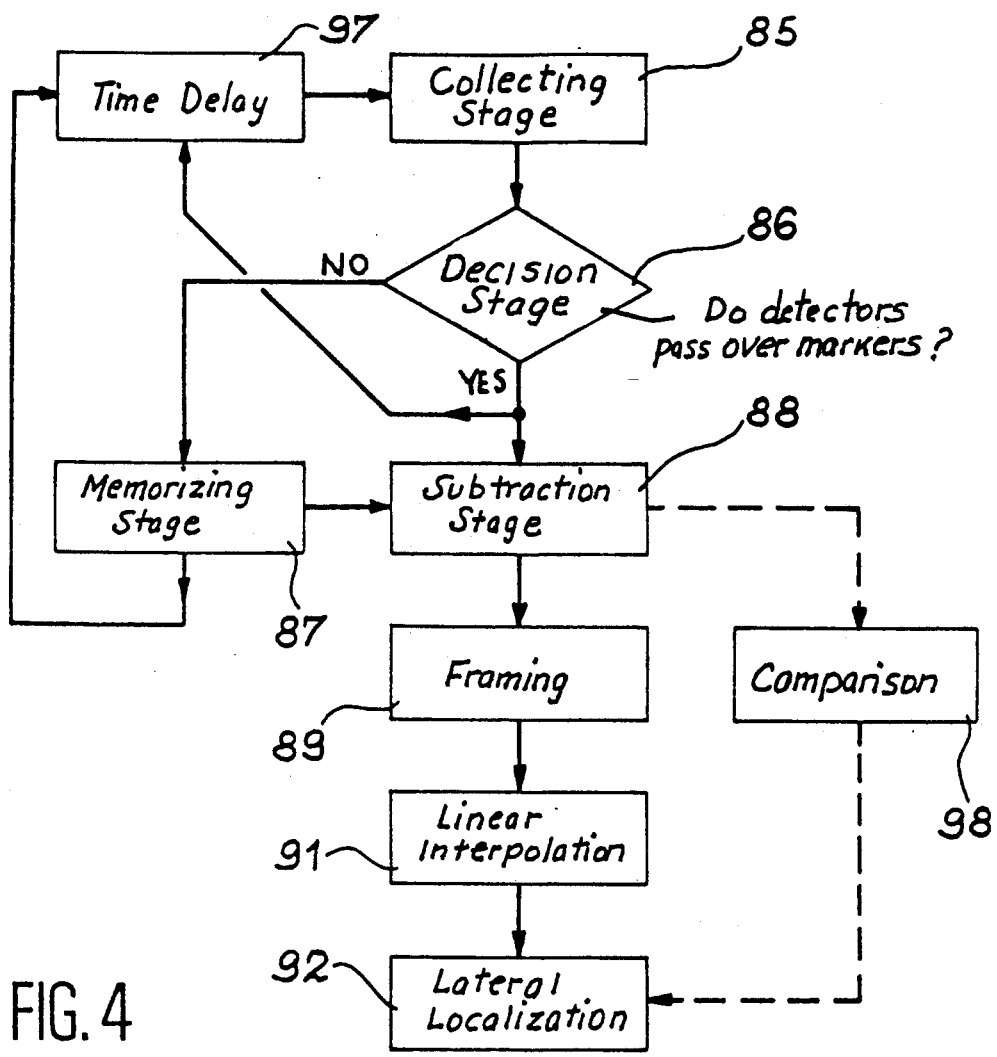
FIG. 4
FIG. 5
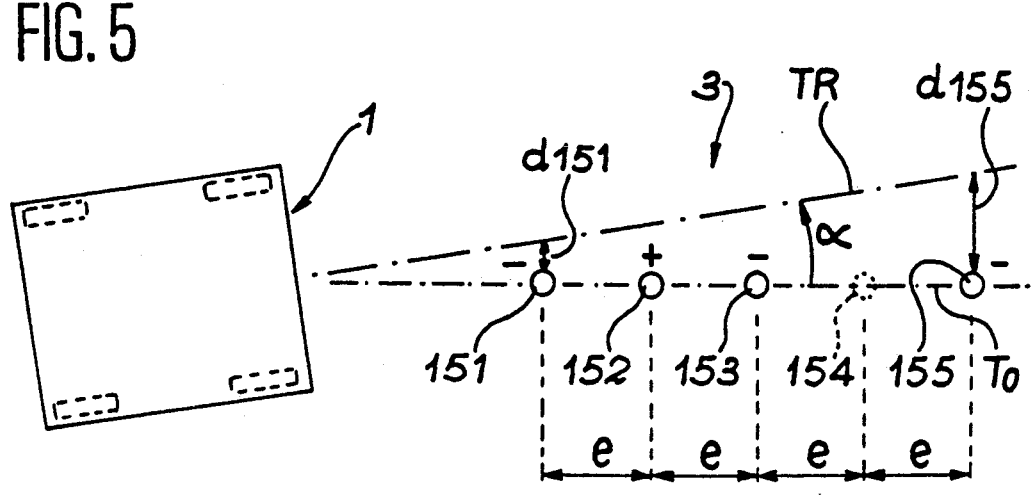

SYSTEM AND METHOD OF NAVIGATING THE TRAVEL OF AN AUTONOMOUS VEHICLE

This is a continuation of copending application Ser. No. 07/506,552 filed on Apr. 5, 1990 now abandoned which is a continuation of application Ser. No. 07/149,388 filed Jan. 28, 1988 (now abandoned).

DESCRIPTION

The invention relates to a system for navigating an autonomous vehicle along a predetermined travel course, which can however be modified, and which is not piloted by a driver; the invention also relates to a method using the system.

The term navigation is taken to mean identifying the position of the vehicle along a travel course and controlling on-board elements, more particularly steering and driving means, to follow such a travel course and correct deviations. Since the vehicle is autonomous, navigation is performed by the automatic recognition of fixed reference points which also enable any other element required for the vehicle's mission to be controlled.

The vehicles in question, such as a cleaning robot in an underground station or factory, must after adequate programming follow a predetermined travel course in a repetitive manner. Since their length may be considerable (a cleaning robot performs its work by moving over parallel strips on a surface), it is out of the question to guide them by mechanical means, such as rails. Neither can there be any guiding be visible locating systems which readily deteriorate, such as reflecting strips. Neither can there by any question of wires buried in the ground, through which an alternating current flows and which emit a magnetic field; these are highly reliable in themselves, but require elaborate installation work, and it is difficult to modify the track they follow. For that reason, although this method is relatively widespread, it has never enjoyed great popularity. Passive locating means have also been suggested, such as buried metallic elements energized by an electromagnet on board the vehicle which causes them to emit a magnetic field which is collected and measured. This method is not absolutely reliable, since the vehicle may misunderstand and identify as a locating terminal a piece of metallic waste thrown away on the ground, something which immediately throws the vehicle out.

The invention provides a system for navigating an autonomous vehicle which is free from these disadvantages and which more particularly uses discontinuous magnetic markers buried in the ground. This method has the advantages over continuous belt or wire systems that it is of moderate price, very simple to install and can easily be shifted and, as will be shown hereinafter, it can be used both for guiding and for controlling other functions of the vehicle.

Another object of the invention is to provide magnetic detectors whose design is adapted to the markers, to limit or eliminate risks of the vehicle being misled, as might be feared because of the discontinous nature of the marking.

The markers are formed by permanent magnets implanted in the ground and so distributed as to produce differentiated localized magnetic fields. Once the magnets have been covered, they are fully protected and have a considerable service life. One possible alternative is to include magnetized products in the very nature of the ground (tiling, cements or the like) without having to break the ground itself.

The vehicle moves successively above the markers, and its lateral deviations can be detected by means of a row of magnetic detectors borne by the vehicle and disposed perpendicularly of the direction of movement thereof.

It is therefore possible to obtain a distribution of items of information in dependence on vehicle width in the form of a stair function which can be compared with reference distributions (with a known position of the vehicle) to deduce therefrom the position of the terminals in relation to such row. With such a procedure, the uncertainty about the lateral position of the vehicle is in practice equal to half the distance between the left-hand or right-hand detectors, supposing the detectors to be regularly spaced out.

The accuracy of localization can be substantially improved if the vehicle has a means for interpolating reference distributions in dependence on the offsetting of the detectors, to deduce therefrom the distribution actually measured.

Moreover, the association in one marker or group of magnets of positive and negative poles (North and South) enables a message coded in binary or ternary code to be included locally. The message, decoded on board, can supply position finding elements or transmit predetermined instructions.

In its most general form, the invention therefore relates to a navigation system for an autonomous vehicle moving along a travel course over the ground, the vehicle comprising more particularly driving means and steering means controlled by an electronic assembly responding to information supplied by magnetic field detectors attached to the vehicle in a transverse row, the system being characterized in that it comprises discontinuous markers formed by permanent magnets which are buried in the ground and punctuate travel by emitting different magnetic fields picked up by the detectors and associated by the electronic assembly with different items of information.

The invention also relates to a method of navigating an autonomous vehicle having more particularly driving means and steering means and an electronic assembly responding to information supplied by a row of magnetic field detectors disposed in a row transversely of the vehicle, the vehicle moving along a travel course punctuated by markers formed by permanent magnets buried in the ground, the method being characterized in that it comprises an operation of periodically collecting the information from the detectors and, when the vehicle passes above a marker in the course of its travel, operations of comparing information supplied by the detectors with the reference information associated with the control of the vehicle.

Figure 3:
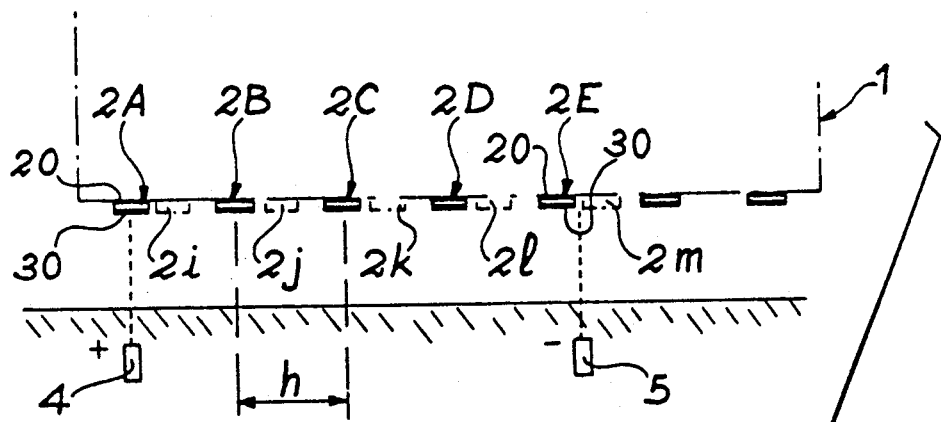
Figure 3:
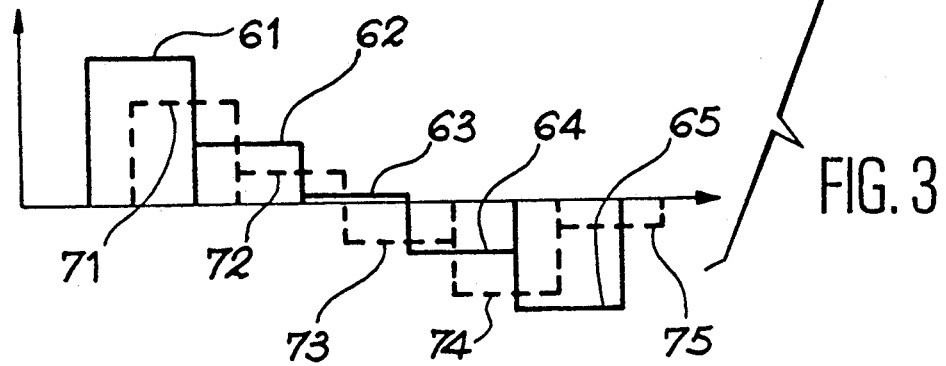
Figure 1A:
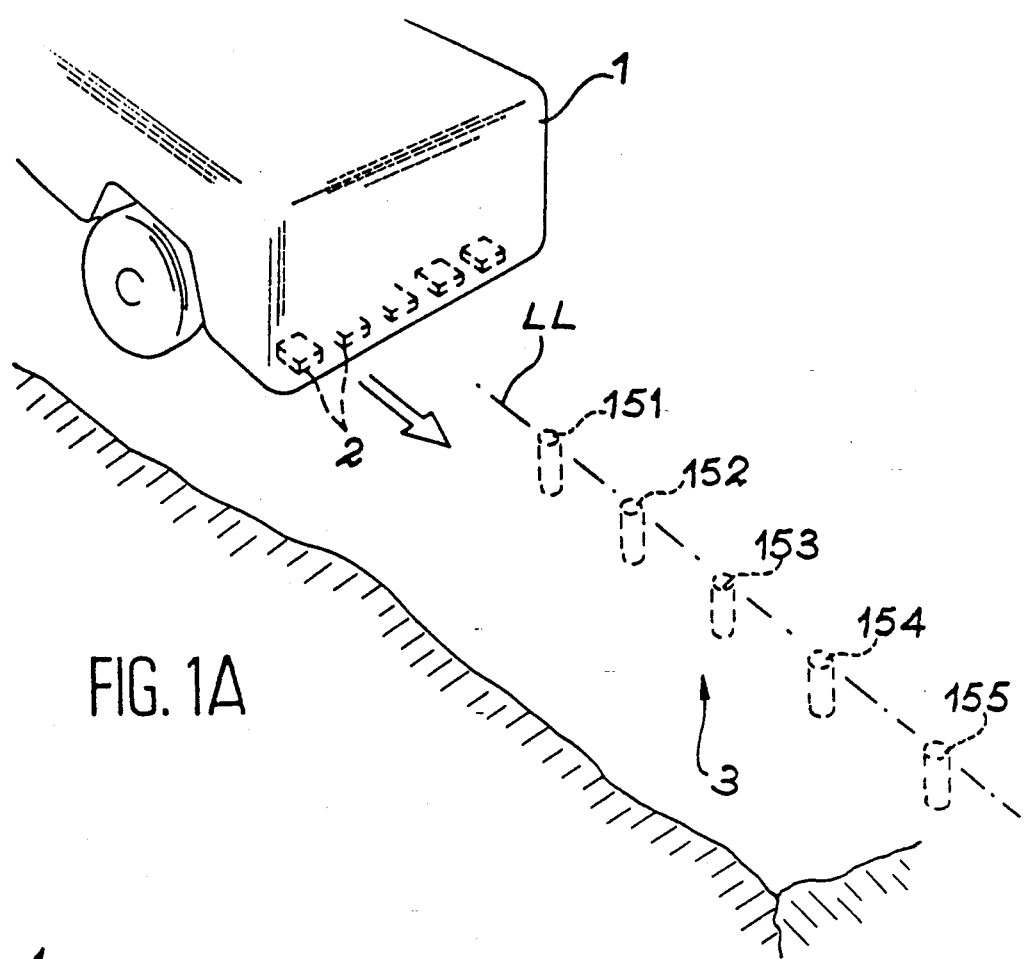
Figure 3A:
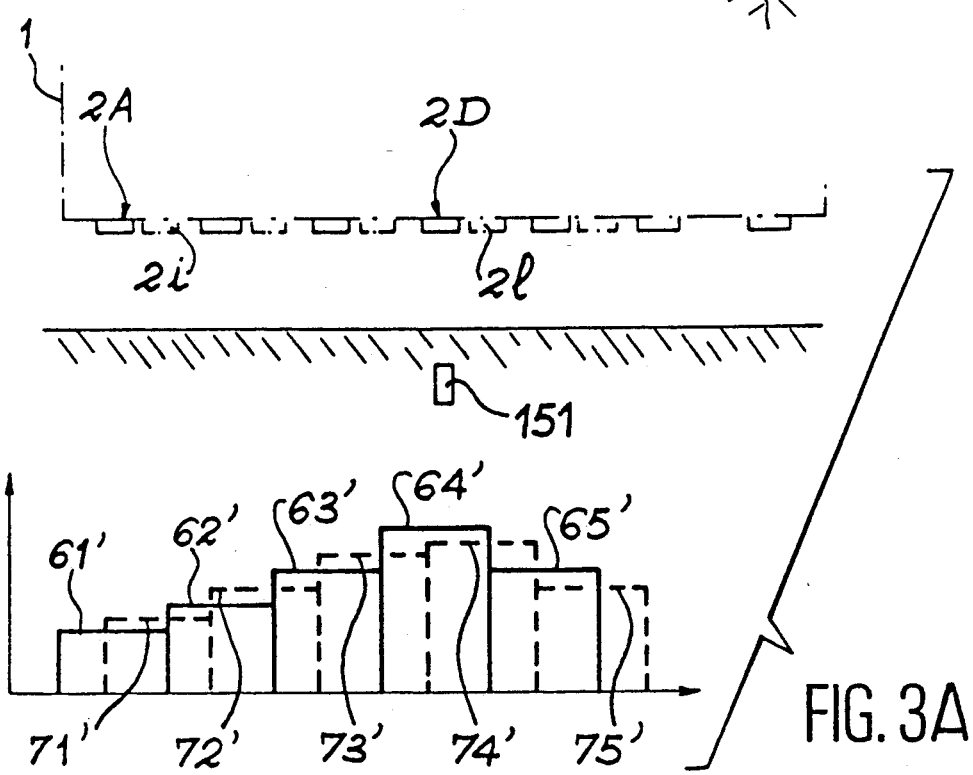
Figure 2:
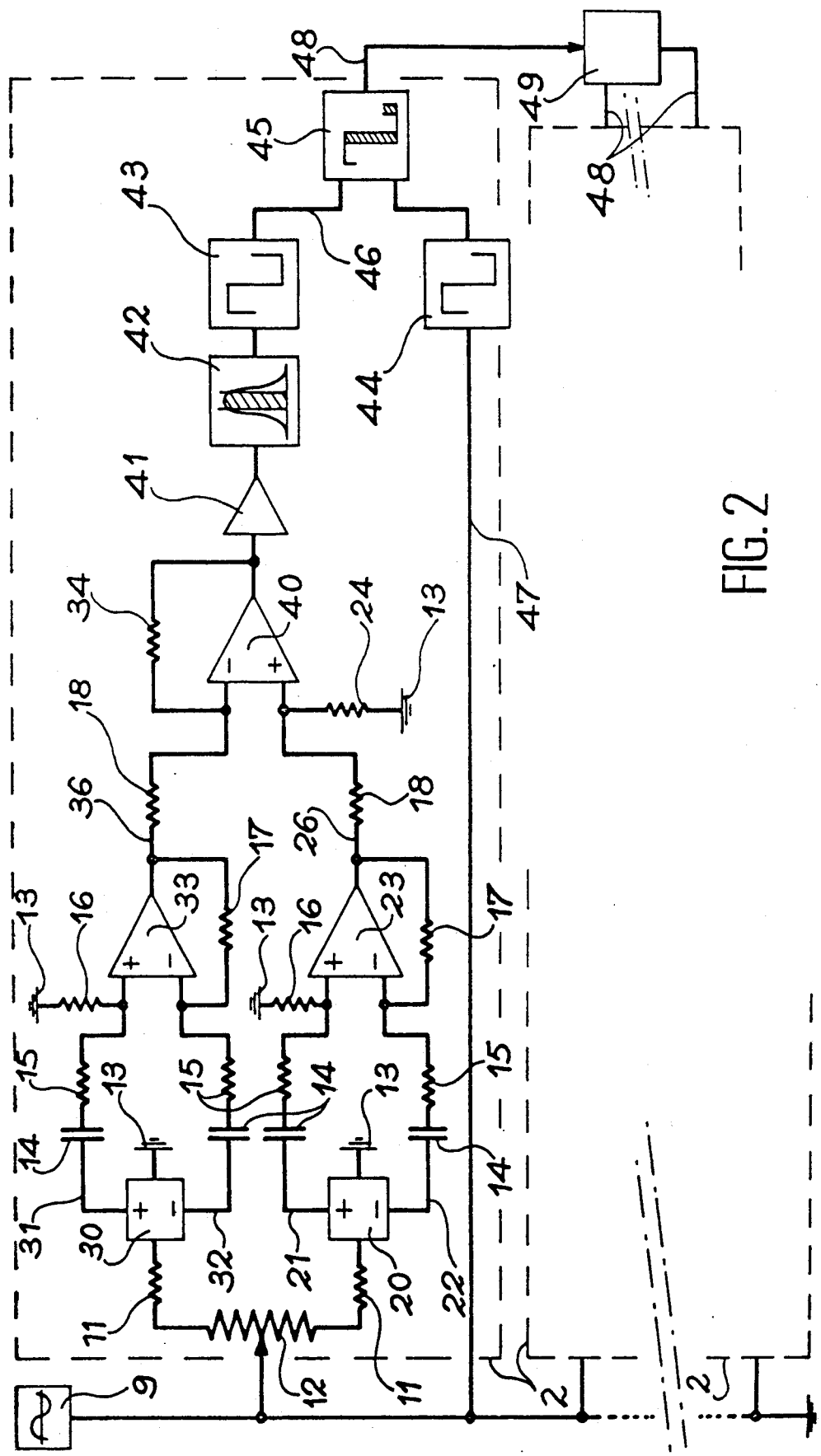
Figure 6:
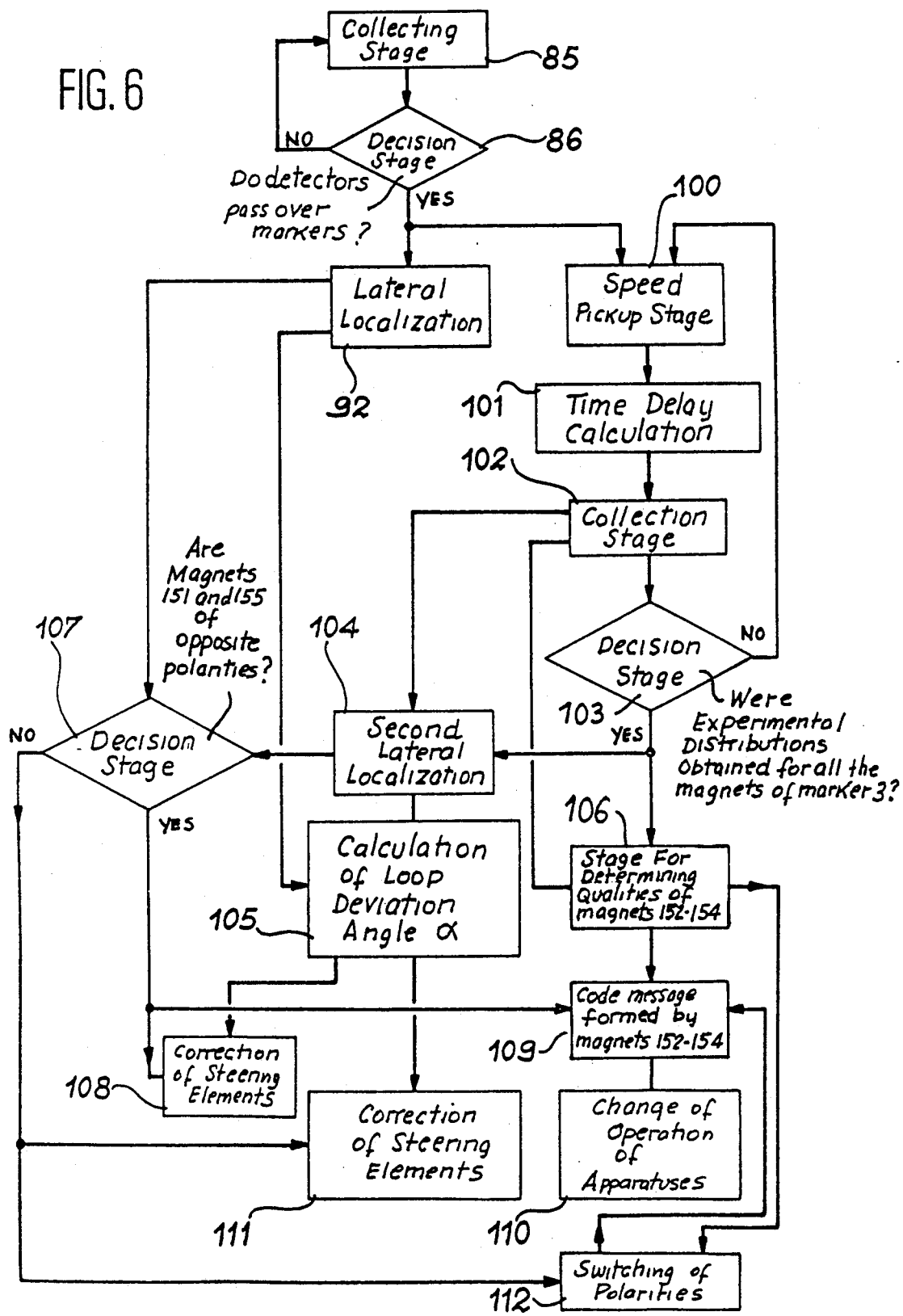
Figure 7:
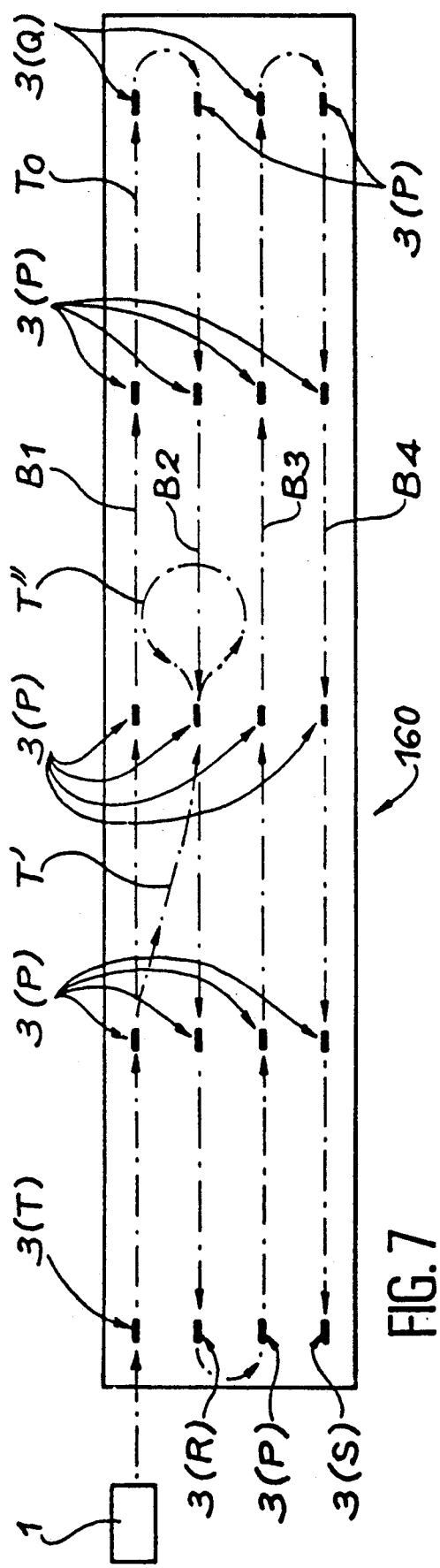
Figure 8:
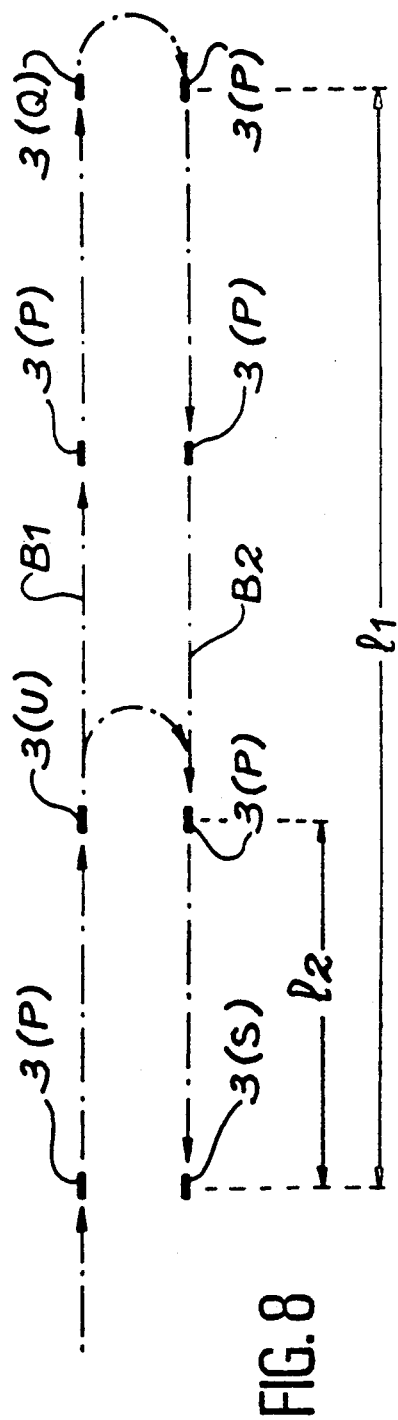

The preferred embodiment of the invention will now be described in an illustrative, non-limitative manner, with possible variants, with reference to the accompanying drawings, wherein:

FIGS. 1 and 1A show a vehicle equiped with the invention and moving over ground having markers according to the invention, FIG. 2 shows the components of the detectors, FIGS. 3 and 3A show typical distributions of information with one row of detectors in two different cases, FIG. 4 is a flow chart of the processing of information obtained by the detectors for detecting the vehicle's position, FIG. 5 shows the method of correcting deviations of the vehicle, FIG. 6 details the method of correcting deviations of the vehicle and reading out information supplied by the magnetic markers, and FIGS. 7 and 8 show different possible ways of including magnetic markers in the ground.

Referring to FIG. 1, the ground over which an autonomous vehicle 1 moves has markers 3 formed by permanent positive 4 and negative 5 magnets setting up localized magnetic fields, the drawing showing an advantageous case in which two positive 4 and two negative magnets 5 are used disposed in a square, on the two diagonals respectively. Such an arrangement ensures considerable field gradients. The sides of the square can be several centimeters in length.

In their most general construction, the markers 3 comprise any number of permanent magnets 4 and 5 distributed in any manner in any number of transverse rows RT, at any intervals amongst the rows RT. The vehicle 1 passes successively above each row RT of permanent magnets 4 and 5 to detect a magnetic field profile which is characteristic of the transverse row RT and can therefore represent a particular item of information.

However, one preferred embodiment is that shown in FIG. 1A, in which each marker 3 comprises a number of permanent magnets 151, 152, 153, 154 and 155 distributed at regular intervals over a single longitudinal line LL in the direction of travel of the vehicle 1. The permanent magnets 151, 152, 153, 154 and 155 can therefore be five at most, and all uniform, except for the polarity of their magnetization. They can consist in vertically disposed cylinders 3 cm in length and 5 cm in diameter whose top is about 2 cm from the surface of the ground and which are spaced out by 125 mm, for example.

The vehicle 1 passes successively above the permanent magnets 151, 152, 153, 154 and 155, as shown in FIG. 1A.

The markers 3 thus buried in the ground along a travel course of the vehicle 1 are of varied types. The number and polarity of the magnetic sources form a personalization—i.e., a signature for distinguishing it from the adjacent markers.

The vehicle 1 comprises a row of magnetic field detectors 2 disposed below the chassis in a transverse row. Their number can plausibly be between five and twenty, in dependence on vehicle width. They can be distributed uniformly or not; here we have the former case, the reference h denoting their spacing, which must be definitely less than the interval between the magnets 4 or 5. Sixteen detectors 2 spaced out by 2 cm can be suggested.

The vehicle 1 comprises driving means and steering means for moving it over the surface of the ground, for example, an electric motor 120 driving front pivoting or steered wheels 121. A more stable caterpillar system of locomotion can also be considered, or else an arrangement with unsteered front wheels each controlled by its own motor, which can give them a differential speed to steer the vehicle. The vehicle 1 also has various apparatuses (not shown) which enable it to perform its mission during its movement, for example, brushes, vacuum cleaners and washing apparatuses in the case of a cleaning robot. The operation of the motor 120, the wheels 121 and such other apparatuses is controlled from a piloting station 49 in dependence on the indication supplied by the detectors 2 and other detectors which are not shown and may include obstacle detectors and a gyroscope inertia station.

During its movement the vehicle 1 passes above a succession of markers 3. When one of them is reached, its magnetic field is detected by the detectors 2 and informs the vehicle 1 of its position in relation to the marker 3 and the tasks to be performed in that case. The construction and operation of the detectors 2 will now be described with reference to FIGS. 2 and 3.

In one particular embodiment the detectors 2 use the Hall effect: a conductive strip through which an electric current flows lengthwise is introduced into a magnetic field perpendicular to its surface and produces an electric field width wise, which can supply an induced voltage. In this case each detector 2 is formed by a pair of Hall-effect pickups 20 and 30. The voltage supplied to the pickups 20 and 30 comes from a source 9 and is periodic. A high frequency sinusodial voltage can be used (several hundreds or thousands of Hertz), so as to eliminate low frequency noise (this problem will be discussed hereinafter); but advantageously a continuous voltage is superposed thereon so that the polarity of the resulting voltage does not change, thereby avoiding dynamic polarization of the pickups 20 and 30.

The supply line of the detectors 2 connects the source 9 to a potentiometer 12, where it forks to the two pickups 20 and 30, which it reaches after passing a resistor 11; the potentiometer 12 enables the currents flowing in the two forking branches to be equalized. After passing the pickups 20 or 30, the line reaches ground 13.

The Hall effect sets up an induced voltage between the lines 21 and 22 coming from the pickup 20 and also an induced voltage between the lines 31 and 32 coming from the pickup 30; these voltages have different intensities, something which is desired and obtained automatically, since the pickups 20 and 30 are adjacent in a non-uniform magnetic field. They are, for example, one above the other at a distance of a few millimeters, as shown in FIG. 3.

The voltages induced in each of the lines 21, 22, 31 and 32 are amplified by a capacitor 14 and a resistor 15 equal and disposed in series, whereafter the voltages induced in the pickups 20 and 30 are obtained by computing a difference between the voltage of the line 32 from the voltage of the line 31 in a subtracter 33 and, in a similar manner, by computing a difference between the voltage of the line 22 from the voltage of the line 21 in a subtractor 23. The differences in voltage are found in the lines 36 and 26 downstream of the subtracters 33 and 23 respectively; it should also be noted that the lines 22 and 26 on the one hand and 32 and 36 on the other hand are connected, near the subtracters 23 and 33, by resistor 17 of the same value, and that the lines 21 and 31 are connected, near to the subtracters 23 and 33, by resistor 16 of value equal to those of resistors 17 to ground 13.

Such circuits enable the amplified voltages to be dephased, dephasing varying in dependence on the voltage: Since the voltages were different at the start, as has been seen, the result is that the voltages on the lines 26 and 36 are not in phase.

After an amplification stage, which can be formed by a resistor a team of the same value on each of the lines 26 and 36, the voltage on the line 36 is subtracted from that on the line 26 by means of a subtractor 40 and the difference passes to a line 46. The lines 36 and 46 are connected, close to the subtracter 40, by a resistor 34;

the line 26 is also connected, near to the subtracter 40, to ground 13 via a resistor 24 of the same value as the resistor 34.

The voltage of the line 46 is amplified by an amplifier 41, then passes through a filter 42 and a transformer 43 which converts it into square wave voltage.

The phase of the signal is then compared with the reference phase, for example, that of the voltage coming from the source 9 after passing a line 47 and a transformer 44 which converts it into square wave voltage. The phase comparator 45 can be of any known kind, but preferably supplies to a line 48 a linear signal in dependence on the dephasing observed.

The assembly formed by the potentiometer 12, the resistors 11, the pickups 20 and 30 and the downstream electronic circuit is identical for all the detectors 2. We therefore obtain a certain number of dephasing signals supplying the piloting station 49 (which comprises more particularly an on-board computer) via the lines 48—i.e., a spatial distribution of dephasing whose usefulness appears from the comments on FIG. 3.

The piloting station 49, which performs the operations to be described, has distributions in its memory as the result of a preliminary calibration, with a known position of the vehicle 1 in relation to the marker 3 in question.

FIG. 3 shows a reference or calibration distribution of dephasing which had been measured when, for example, a detector 2A was above a positive magnet 4 and a detector 2E almost above a negative magnet 5, with three intermediate detectors 2B, 2C and 2D, the levels 61 to 65 being associated with the detectors 2A to 2E respectively. The vehicle 1 can also be provided with other detectors on either side of those illustrated, but they are not used in this case, since they pass wide of the marker 3 and record no signal of importance.

When the vehicle 1 passes above the marker 3 again in the course of one of its travels, it does so with some lateral offsetting in relation to its calibration position: The detectors closest to the positions associated with the detectors 2A to 2E have the references 2i to 2m and their dephasing distribution is indicated by the experimental levels 71 to 75 which they measure respectively, and whose knowledge will enable the vehicle 1 to perform its mission. An explanation will be given with reference to FIG. 4 as regards the knowledge of the lateral position of the vehicle 1 in relation to the marker 3.

The process used first comprises a periodic collecting stage 85 of the information supplied by the detectors 2, then a decision-taking stage 86, in dependence on whether or not they pass above a marker 3.

If the detectors 2 record only a background noise characterizable by its fairly low level and its low frequency, the information of the detectors 2 is stored by a memorizing stage 87 and the collection 85 resumes after a time delay 97.

If a marker 3 is detected, the information collected in the course of the preceding memorizing stage 87 are subjected to subtraction 88, thus enabling the background noise, whose level changes relatively slowly, to be eliminated. However, in practice such subtraction 88 is not obligatory if an approximate lateral localization is enough.

Then an experimental distribution 71 to 75 is available which must be compared with a reference distribution 61 to 65. At least one experimental level 71 to 75 is selected and in a possible embodiment of the method its closest reference level 61 to 65 is sought.

For example, we may be interested in the level 71 delivered by the detector 2i and decree that the closest reference level 61 has been delivered by the detector 2A. We then conclude that the detector 2i is in the position of the detector 2A, and such comparison 98 therefore enables the lateral position of the vehicle 1 to be determined to substantially one half-interval h/2 between detectors on the left or on the right, if they are uniformly distributed.

In a more careful embodiment of the method, however, after subtraction 88 we obtain a framing 89 of the or each experimental level selected by reference levels: To take the example again, we determine that the level 71 delivered by the detector 2i lies between the levels 61 and 62 delivered by the adjacent detectors 2A and 2B. We then carry out linear interpolation 91 to determine the position of the detector 2i in the interval between the detectors 2A and 2B. The lateral position of the vehicle 1 is known with much better accuracy.

Of course, it is possible and desirable to make the comparison 98 or framing 89 apply to a number of detectors at the same time, inaccuracies being reduced thereby.

The comparisons 98 or interpolations 91 therefore enable the lateral localization 92 of the vehicle 1 to be determined.

The collections 85 are then performed regularly after the time delay 97.

With a marker 3 of the kind illustrated in FIG. 1A, the method is exactly the same as illustrated in FIG. 3A. The experimental levels are denoted by 71' to 75' and the reference levels are denoted by 61' to 65'. If the row of detectors 2 passes, for example, above the permanent magnet 151 with the detector 21, which records the highest experimental level 74', while in the lateral reference position the detector 2D was above the magnet 151 and thus recorded the highest reference level 64', it is possible to simply record the highest experimental level 74' and to assimilate by a comparison operation 98 the reference position of the detector 2D and the experimental position of the detector 21. Linear interpolations between experimental and reference levels can in this case also enable more precise information to be obtained about the lateral position of the vehicle 1.

However, a problem continues to exist, since the mere localization of the lateral position of the vehicle 1 is not enough either to steer it or to enable other elements to be controlled. FIGS. 5 and 6 show how to do this with a marker 3 as shown in FIG. 1A, which therefore comprises five aligned magnets 151, 152, 153, 154 and 155.

The two end magnets 151 and 155 are of opposite polarity, in this case positive and negative respectively. The intermediate magnets 152, 153 and 154 can be either positive or negative and therefore give a linear coding which in this case gives $2^3 = 8$ possibilities. In an equivalent embodiment, the intermediate magnets 152, 153 and 154 can also be omitted, thus enabling a ternary coding to be obtained with $3^3 = 27$ possibilities in the case of three magnets.

The passage of the vehicle 1 above the marker 3 actually results in the operations which will now be described.

As in the description of FIG. 4, periodic collections 85 are performed, and the marker 3 is localized when the detectors 2 arrive on the first magnet 151. In this way the lateral localization 92 of the vehicle is obtained—i.e., the deviation d151 from the real experimental travel TR of the vehicle in relation to the theoretical travel To passing right over the marker 3. In parallel, the speed V of the vehicle 1 is recorded by means of any speed pickup in a stage 100, and the piloting station 49 performs a time delay calculation 101 which gives it a time delay $T = e/V$, where e is the spacing between two consecutive permanent magnets. When the delay time has elapsed, a collection 102 of information is performed above the following permanent magnet (in this case 152) by the detectors 2, something which gives a fresh distribution of experimental values, which are stored in the memory. A loop 103 makes sure that experimental distributions were obtained for all the magnets of the marker 3; if not, the process of recording speed 100, time delay 101 and collection 102 is repeated above the following permanent magnet; if so, the piloting station 49 knows that the last distribution recorded is that of the last permanent magnet 155. A second lateral localization 104 is performed, which gives the deviation d155 of the vehicle 1 in relation to the last permanent magnet 155. It is then possible to calculate the loop deviation angle $\alpha$ which in practice is small and obtained by the formula $\alpha = (d155 - d151)/4e$. This calculation is performed in the course of a stage 105. At the same time a stage 106 is performed for determining polarities (positive, negative or possibly nil) of the intermediate magnets 152, 153 and 154. However, the admittedly improbable case had to be provided in which the vehicle 1 might have lost its way to the point of falling back on the marker 3 after incorrect travel and passing over the marker in the wrong direction, starting with the last magnet 155. It is for this reason that the end magnets 151 and 155 are of opposite polarities. A step 107 for checking the order of polarities encountered for the end magnets 151 and 155 allows a check as to whether the vehicle 1 is moving in the correct direction. If so, a loop correction 108 is applied to the steering elements of the vehicle 1, such as pivoting wheels, the correction being substantially equal to the opposite of the angle of deviation $\alpha$, by possible applying a correctional factor in dependence on the mean deviation $(d151 + d155)/2$, to enable the vehicle 1 to pass as close as possible to the following marker; moreover, the assembly of polarities of the intermediate magnets 152, 153 and 154 forms a coded message 109 which, after is has been read and interpreted by the piloting station 49, leads to modifications in the operation 110 of apparatuses situated on the vehicle 1 such as, in the case of a cleaning robot, starts or interruptions of washing, suction or brushing. The coded messages 109 can also be used to control quarter turns, half turns and the stoppage of the vehicle.

If the vehicle 1 is moving in the wrong direction, we apply to it a loop correction 111 substantially equal to the preceding one plus one half turn, which therefore returns the vehicle 1 to the correct direction of travel. An inversion or switching 112 is also performed of the order of polarities successively recorded on the intermediate magnets 152, 153 and 154, in order to restore the correct coded message 109.

Certain of the advantages of the invention will now be listed and described with reference to the last drawings.

FIG. 7 shows markers 3 introduced into the ground of a rectangular surface 160, for example, an underground platform to be cleaned, over which the vehicle 1 is to pass in a travel to broken up into parallel strips B1 to B4 over which it passes in alternate directions. Each of the strips B1 to B4 has markers 3 as shown in FIG. 1A whose intermediate magnets 152, 153, 154 correspond to a code which is indicated by a letter in brackets for each marker 3. The majority display the code P, indicating that the vehicle 1 is to advance in a straight line; at the end of each strip B1 to B3, the vehicle 1 in contract encounters a marker 3 carrying the code Q or R as the case may be, which orders the vehicle to perform a half turn to the right or left to enable it to join the following strip; the end of the last strip B4 can have a marker bearing the code S which stops the vehicle 1, its mission being then completed, until action is taken manually; lastly, the first marker of the first strip B1 bears a code T which indicates at one and the same time a straight line and the start of the cleaning operations.

This drawing, in which an attempt has been made to indicate true scales, immediately shows the superiority of the device according to the invention over the known guide wire devices: Such a wire would have to be placed over the whole of the travel To and would therefore be very long and difficult and expensive to install, whereas with the numerical data already given (each marker 3 comprising five permanent magnets spaced out by about 125 mm), each marker 3 can be spaced out from the following marker by a distance which can be ten metres, if the vehicle 1 passes over such a distance in a straight line. Moreover, it is enough to drill easily, quickly and locally in the ground for the installation or replacement of the markers 3.

However, it might be feared that discontinuous marking would increase risks that the vehicle 1 might go astray as a result of inaccurate steering. Actually, such risks are very limited. Supposing, with a row of detectors 2 thirty centimetres wide, with the vehicle perfectly centred on a first marker, a deviation in travel causing it to pass outside the following marker, this would imply a lateral error of fifteen centimetres over a travel course of ten metres—i.e., an angular error of about one degree, which modern piloting means, such as inertia stations, should be able to prevent.

In any case, if things should go badly wrong, the vehicle 1 has infrared obstacle pickups which enable the vehicle 1 to be locked as it approaches a wall or a difference in level. The piloting station 49 can also be programmed to stop the vehicle 1 and sound an alarm if no marker 3 has been detected after too long a travel.

With a configuration of markers 3 such as that shown in FIG. 7, the case may also occur which is mentioned in the comments on FIG. 6, namely a marker 3 is reached in the wrong direction after an abnormal deviation, as a result, for example, of an incorrect section of travel T' which would bring the vehicle from one strip B1 to the adjoining strip B2 without a half turn. The piloting station 49 immediately detects the wrong direction and stops the vehicle 1 or causes it to make a T" loop which brings it back to the right direction and enables it to pass over the strip B2 correctly and continue its mission.

However, abnormal deviations from the travel To should remain exceptional.

FIG. 8 shows how the vehicle 1 may perform different missions without changing the marking, something which is also impossible with other localization systems. For example, a marker 3 can bear a code U which, in dependence on the programming of the piloting station 49, can be given in turn the same meaning as the codes P or Q—i.e., advance in a straight line or make a half turn to the right. In the former case, with the configuration shown the vehicle 1 performs a travel over the total length 11 of two parallel strips B1 and B2; in the latter case it makes a travel over a reduced width 12 of the strips B1 and B2.

The invention therefore forms an advantageous system for the navigation and automatic control of vehicles required to perform repetitive predetermined missions. No complicated information system is needed; the programming of the piloting station 49 is limited to reading magnetic field distribution detectors and interpreting such distributions to deduct therefrom polarities and codes, or information of lateral deviation. No preliminary programming is therefore required to describe its travel and missions to the vehicle, since it learns these as it arrives in front of each marker 3.

We claim:

1. A navigation system for an autonomous vehicle travelling over a ground surface comprising:
   discrete markers formed by permanent magnets in said surface so that adjacent markers have different magnetic fields, the markers having lengths smaller than distances separating successive markers along a travel course of the vehicle;
   a transverse row of magnetic field detectors secured to a vehicle so as to supply a piloting station with information for controlling said vehicle, each detector comprising a pair of pickups and a means for computing a difference between output signals produced by said pickups under a influence of said magnetic fields, said pickups for each detector overlying one another.

2. A navigation system for an autonomous vehicle according to claim 1, wherein the permanent magnets of each marker are buried in the ground in a line, the transverse row of detectors passing successively above each permanent magnet during the vehicle's travel.

3. A navigation system for an autonomous vehicle according to claim 2, wherein the line of magnets comprises two dissimilar magnets which supply the piloting station with a magnetic profile that represents the direction of the vehicle's travel.

4. A navigation system for an autonomous vehicle according to claim 1, wherein the magnets form a binary code.

5. A navigation system for an autonomous vehicle according to claim 1, wherein the magnets form a ternary code.

6. A navigation system for an autonomous vehicle according to claim 1, wherein the magnets of each marker are disposed in parallel rows on the ground.

7. A navigation system for an autonomous vehicle according to claim 1, wherein the pickups are supplied with a periodic electric voltage, from a voltage source, which is always of the same polarity.

8. A navigation system for an autonomous vehicle according to claim 7, wherein the each detector comprises: a circuit for dephasing currents induced in each pickup in relation to their intensity; a circuit for computing a difference between the dephased currents; and a phase comparator which delivers a signal in relation to the dephasing between a periodic current coming from the circuit for computing a difference between and a reference current of a same frequency.

9. A navigation system for an autonomous vehicle according to claim 7, further comprising a potentiometer interposed between the voltage source and each pair of pickups.

10. A method of navigating an autonomous vehicle controlled by a piloting station responding to voltage information, said method comprising
    providing magnetic field detectors disposed in a row transversely of said vehicle for producing voltage information for said piloting station,
    advancing said vehicle over a ground surface of a travel course,
    placing markers formed by permanent magnets in said ground surface, the markers having lengths smaller than distances separating successive markers along said travel course of the vehicle,
    providing adjacent markers with different magnetic fields,
    periodically collecting voltage information from the detectors,
    comparing the voltage information from the detectors with reference voltage information stored in the piloting station when the vehicle passes a marker,
    obtaining control information from the collected and compared voltage information, the control information including information representing the transverse position of the vehicle relative to the marker, and
    navigating the vehicle with the control voltage information.

11. A method of navigating an autonomous vehicle according to claim 10, wherein the permanent magnets of each marker are buried in the ground in a line, the transverse row of detectors passing successively above each permanent magnet during the vehicle's travel, and wherein the comparison operations consist of identifying a magnetic field profile associated with at least one of the magnets with one of two reference magnetic field profiles to obtain coded messages.

12. A method of navigating an autonomous vehicle according to claim 10, wherein the permanent magnets of each marker are buried in the ground in a line, the transverse row of detectors passing successively above each permanent magnet in the course of vehicle travel, and wherein the comparison operations consist of identifying a magnetic field profile associated with at least one of the magnets with one of three reference magnetic field profiles to obtain coded messages.

13. A method of navigating an autonomous vehicle according to claim 10, wherein during the comparison, the position of at least one detector, from which a magnetic field profile is collected, is assimilated to the reference position of at least one detector whose reference magnetic field profile is closest to the collected magnetic field profile to deduce therefrom the transverse position of the vehicle during the comparison.

14. A method of navigating an autonomous vehicle according to claim 10, wherein the transverse position of the vehicle at the time of the comparison is obtained by linear interpolation between the reference voltage information of at least one pair of adjacent detectors to recover the item of information collected by comparison of at least one detector, to deduce therefrom the position during comparison of such detector between the reference positions of the pair of adjacent detectors.

15. A method of navigating an autonomous vehicle according to claim 10, wherein the voltage value collected by a detector during a preceding collection is substracted from the collected voltage value when detectors are above a marker.

16. A method of navigating an autonomous vehicle according to claim 10, wherein the transverse position of the vehicle relative to the markers is measured twice, the measurements being performed when the vehicle passes over two magnets separated by a known distance, and further comprising the step of computing an actual travel direction therefrom.

17. A navigation system for an autonomous vehicle travelling over a ground surface comprising: contiguous strips of discrete markers formed by permanent magnets which are buried in the ground so that adjacent markers have different magnetic fields, the markers having lengths smaller than distances separating successive markers along a travel course of the vehicle, and a transverse row of magnetic field detectors secured to the vehicle and supplying voltage information for controlling the vehicle to a piloting station, wherein the markers comprise two dissimilar magnets which are separated by a known distance, for determining whether the markers are travelled over by the vehicle in a correct direction, the piloting station operating driving and steering means of the vehicle with the voltage information.

18. A navigation system according to claim 17, wherein the contiguous strips of markers are travelled over by the vehicle in alternate directions.

19. A navigation system according to claim 17, wherein the said two magnets include a positive magnet and a negative magnet.

20. A navigating system according to claim 17, wherien the magnets of the markers produce either purely positive or purely negative magnetic fields over the ground surface.

* * * * *